(12) United States Patent
Upadhyay et al.

(10) Patent No.: US 12,526,280 B2
(45) Date of Patent: Jan. 13, 2026

(54) AUTOMATED ROLE-BASED ACCESS CONTROL SCOPE CHANGE

(71) Applicants: Anshuman Upadhyay, South Windsor, CT (US); Colleen Ryan, Manchester, CT (US); David Maraia, New Hartford, CT (US)

(72) Inventors: Anshuman Upadhyay, South Windsor, CT (US); Colleen Ryan, Manchester, CT (US); David Maraia, New Hartford, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 41 days.

(21) Appl. No.: 18/655,425

(22) Filed: May 6, 2024

(65) Prior Publication Data

US 2025/0343797 A1    Nov. 6, 2025

(51) Int. Cl.
*H04L 29/06* (2006.01)
*H04L 9/40* (2022.01)

(52) U.S. Cl.
CPC .......... *H04L 63/101* (2013.01); *H04L 63/105* (2013.01)

(58) Field of Classification Search
None
See application file for complete search history.

(56) References Cited

U.S. PATENT DOCUMENTS

| | | | |
|---|---|---|---|
| 6,088,679 A | 7/2000 | Barkley | |
| 7,996,893 B2 | 8/2011 | Persaud-Deolall et al. | |
| 11,487,573 B2 | 11/2022 | Parikh et al. | |
| 11,627,140 B2 | 4/2023 | Faulkner | |
| 2002/0178119 A1 | 11/2002 | Griffin et al. | |
| 2011/0191485 A1* | 8/2011 | Umbehocker | H04L 63/0428 709/229 |
| 2019/0384632 A1 | 12/2019 | Parikh et al. | |
| 2021/0099453 A1* | 4/2021 | Cohen | H04L 63/105 |
| 2022/0078195 A1* | 3/2022 | Sehgal | H04L 63/20 |
| 2022/0103566 A1 | 3/2022 | Faulkner | |
| 2023/0110527 A1 | 4/2023 | Bhat et al. | |
| 2023/0370466 A1* | 11/2023 | Li | G06F 21/6218 |
| 2024/0176513 A1* | 5/2024 | Bradley | G06F 3/067 |
| 2024/0394700 A1* | 11/2024 | Kwong | G06F 3/04847 |

* cited by examiner

*Primary Examiner* — Shin-Hon (Eric) Chen
(74) *Attorney, Agent, or Firm* — Buckley, Maschoff & Talwalkar LLC

(57) ABSTRACT

An enterprise back-end application computer server may implement an access control system for an enterprise. A Role-Based Access Control ("RBAC") scope data store may contain electronic records associated with a plurality of scopes for the enterprise. For each scope, the RBAC scope data store may include a set of computing resources that are accessible by roles associated with that scope. A computer processor of the back-end application computer server may identify a computing resource landscape change for the enterprise. Responsive to the identified computing resource landscape change, the computer server may automatically determine a modification to a set of computing resource access rules for at least one role. The system may then, responsive to the determination, automatically update the associated electronic record for the appropriate scope in the RBAC data store to reflect the computing resource landscape change.

11 Claims, 16 Drawing Sheets

Role-Based Access Control (RBAC) System: IT Ticketing Tool

Number: T_100001  State: Closed
Item: Cloud DBS  Approval: Approved
Request: REQ_123456  Quantity: 1
Requested For: Jane Smith  Delivery Date:
Group: Sales Assigned To: ⟵ 710
Opened: 10-26-2027
Created By: Automation
Stage: Complete Short Description: This catalog item is auto-generated using REST API for new DBS  ⟵ 720

Description: ⟵ 730

*FIG. 7*

{"dbRole":"Primary","environmentType":"NONPROD","accountType":"NONPROD","dbName":"NonProd","dbName":"ABC","stackId":"mtax-app-123-dev-ue1-ds-123456","dnsName":"mtaxdev.db.corpfinnp.cdlnp.example.com","endpointName":"mtax-app-123-dev-ue1-ora-ds.abcdefg.us-east-1.ds.amazonaws.com", "EncryptionSetting":"false", "snapshotidentifier":"","eventType":"Create", "accountNumber": "1234567", "dbidentifier":"abc-app-123-dev-ue1-orads", "requestFor": "jane.smith@example.com", "organizationType": "prod", "instanceSize" : "db.rS.large" , "engine" : "oracl eee", "port":"1234", "dataClassification": "CompanyConfidential","planITAppId":"APP-123-NONPROD","vpcid":"vpc-123456","servieceTier":"Bronze","reqToken":"abcdefghijk" ,"request By":"jane.smith@example.com", "region":"us-east-1","callerName":"IdentityManager","CATALOG_NAME":"Cloud DS Database Provision" ,["Ticket Number":"T_100001", "TASK_ASSIGNMENT_GROUP":"IDENTITY MANAGER AUTO AGENT","STATUS":"Work in Progress" ,] "TASK_ID":"123457890"}

FIG. 8

AUTOMATED ROLE-BASED ACCESS CONTROL SCOPE CHANGE

TECHNICAL FIELD

The present application generally relates to computer systems and more particularly to computer systems that are adapted to accurately, securely, and/or automatically support role-based access control scope changes for an enterprise.

BACKGROUND

An enterprise, such as an insurer, may implement Role-Based Access Control ("RBAC") or role-based security to restrict access to computing resources to authorized users. For example, the enterprise may want managers to have access to certain information within a database while other employees do not. RBAC is a policy-neutral access control mechanism defined around roles and privileges. The components of RBAC (such as role-permissions, user-role, and role-role relationships) may help simplify such user assignments. RBAC can be used to facilitate administration of security in large organizations with thousands of users and many thousands of permissions.

FIG. 1 shows an example 100 of a rule-base access control implementation to control access to computing assets or services 140 by various users 110 (e.g., users A, B, and C). Within the enterprise, roles 120 (e.g., role one and role two) may be created for various job functions and the permissions to perform certain operations are assigned to specific roles 120. Each role 120 could be associated with, for example, attributes, roles, explicit policies, etc. Placing each user 110 into a role 120 might be based on, for example, user attributes (e.g., employee status, job title, etc.). For example, as illustrated in FIG. 1, users A and B may be assigned to role one while user C is assigned to role two. Since users 110 are not assigned permissions directly (and instead acquire them through the role or roles 120), management of individual user rights only involves assigning appropriate roles 120 to each user account (simplifying common operations such as adding a user or changing a user's department). The roles 120 may be allowed access to the asset 140 based on one or more rules 130. According to some embodiments, additional constraints may be applied, and roles 120 can be combined in a hierarchy where higher-level roles 120 subsume permissions owned by sub-roles.

In this way, RBAC may offer a simple, manageable approach to access management that is less prone to error than assigning permissions to users individually. An enterprise may analyze the needs of users and group them into roles based on common responsibilities. RBAC may help an enterprise: create systematic, repeatable assignments of permissions; audit user privileges and correct identified issues; quickly add and change roles, as well as implement them across various services; cut down on the potential for error when assigning user permissions; integrate third-party users by giving them pre-defined roles; more effectively comply with regulatory and statutory requirements for confidentiality and privacy, etc.

Thus, an enterprise may use RBAC to grant and control permissions to users. Access granted through an RBAC role typically comprise a "static set" of roles/permissions/privileges to applications within an enterprise. For example, RBAC roles may be based on Active Directory ("AD") user login (such as a network login) account and physical ID badges for employees and may be inclusive of automatically provisioning access specific to (and associated with) a certain department that represents a portion of the hierarchy within the enterprise. Updates to a RBAC role may require Information Technology ("IT") tickets, meetings with stakeholders, etc. These represent a work effort of time and resources that must be spent to accommodate the RBAC role to a changing landscape. When an enterprise moves to a cloud-based computing environment, there may be additional focus to manage access and to grant access with reduced human intervention.

For example, new databases provisioned in a cloud computing environment may be sent for onboarding to an identity manager tool through an automated ticket request tool. Then a manual IT ticket request needs to be submitted to gain access to the newly provisioned database. A similar process may be implemented a decommissioned database. Manually processing such changes can be a time-consuming and difficult task, especially when a substantial number of requests are received by an enterprise. It would be desirable to provide improved systems and methods to accurately and/or automatically support RBAC scope changes for an enterprise. Moreover, the results should be easy to access, understand, interpret, update, etc.

SUMMARY OF THE INVENTION

According to some embodiments, systems, methods, apparatus, computer program code and means are provided to accurately and/or automatically support role-based access control scope changes for an enterprise in a way that provides fast, secure, and useful results and that allows for flexibility and effectiveness when responding to those results.

Some embodiments are directed to an access control system for an enterprise that is implemented via a back-end application computer server. A RBAC scope data store may contain electronic records associated with a plurality of scopes for the enterprise. For each scope, the RBAC scope data store may include a set of computing resources that are accessible by roles associated with that scope. A computer processor of the back-end application computer server may identify a computing resource landscape change for the enterprise. Responsive to the identified computing resource landscape change, the computer server may automatically determine a modification to a set of computing resource access rules for at least one role. The system may then, responsive to the determination, automatically update the associated electronic record for the appropriate scope in the RBAC data store to reflect the computing resource landscape change.

Some embodiments comprise: means for identifying, by a computer processor of the back-end application computer server, a computing resource landscape change for the enterprise; responsive to the identified computing resource landscape change, means for automatically determining a modification to a set of computing resource access rules for at least one role; and responsive to the determination, means for automatically updating an associated electronic record for an appropriate scope in a RBAC scope data store to reflect the computing resource landscape change, wherein the RBAC scope data store contains electronic records associated with a plurality of scopes for the enterprise and, for each scope, a set of computing resources that are accessible by roles associated with that scope.

In some embodiments, a communication device associated with a back-end application computer server exchanges information with remote devices in connection with interactive graphical user interfaces. The information may be exchanged, for example, via public and/or proprietary communication networks.

A technical effect of some embodiments of the invention is improved and computerized support of role-based access control scope changes for an enterprise that provides fast, secure, and useful results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 7 is a graphical IT ticket display in accordance with some embodiments.

FIG. 8 is an internal API call to onboard a database according to some embodiments.

DETAILED DESCRIPTION

Figure 1:
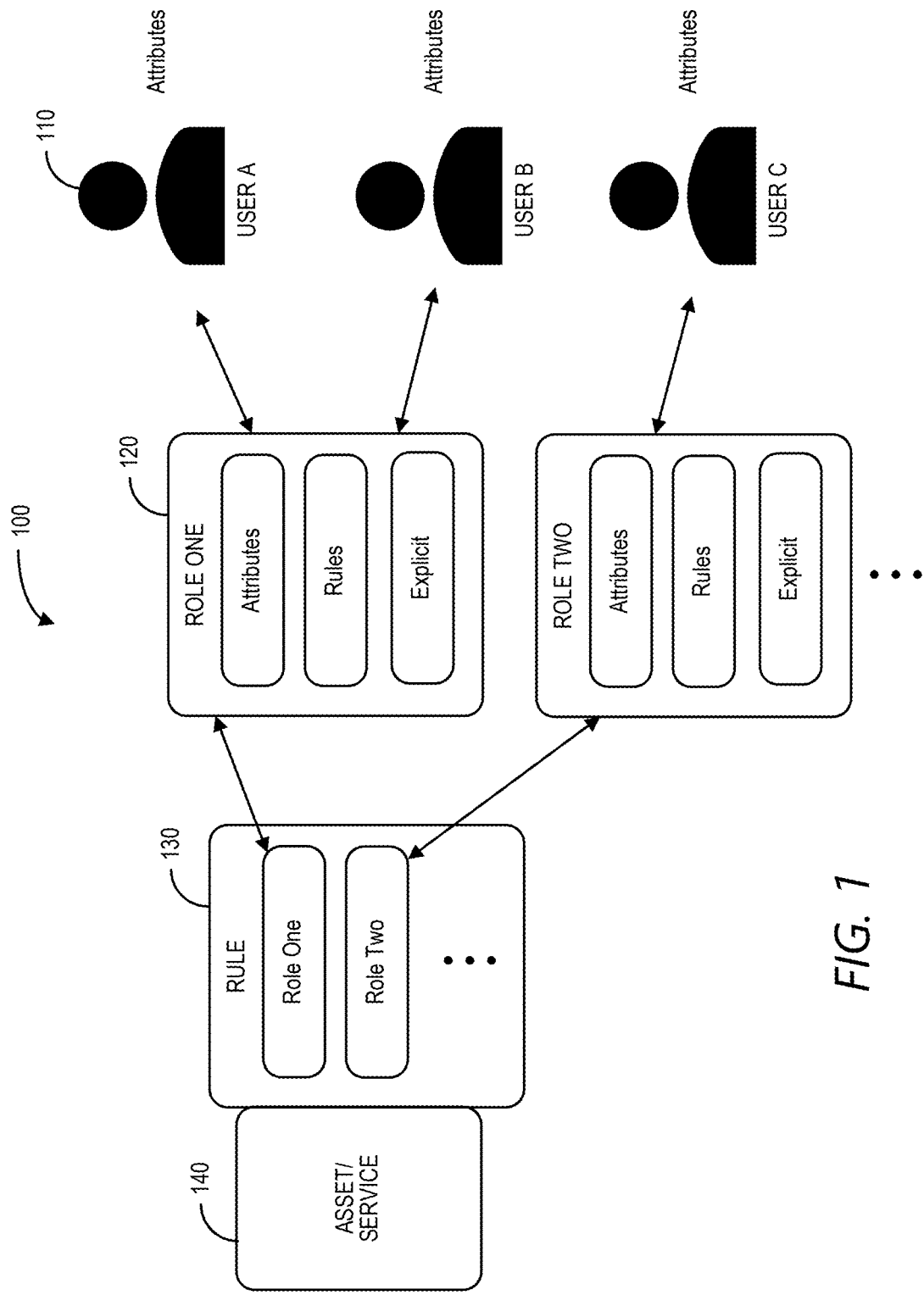
FIG. 1 shows an example of a rule-base access control implementation.

Before the various exemplary embodiments are described in further detail, it is to be understood that the present invention is not limited to the particular embodiments described. It is also to be understood that the terminology used herein is for the purpose of describing particular embodiments only and is not intended to limit the scope of the claims of the present invention.

In the drawings, like reference numerals refer to like features of the systems and methods of the present invention. Accordingly, although certain descriptions may refer only to certain figures and reference numerals, it should be understood that such descriptions might be equally applicable to like reference numerals in other figures.

The present invention provides significant technical improvements to facilitate data processing associated with an RBAC system. The present invention is directed to more than merely a computer implementation of a routine or conventional activity previously known in the industry as it provides a specific advancement in the area of access control by providing improvements in the operation of a computer system that automatically implements scope changes. The present invention provides improvement beyond a mere generic computer implementation as it involves the novel ordered combination of system elements and processes to provide improvements in the speed, security, and accuracy of such an RBAC tool for an enterprise. Some embodiments of the present invention are directed to a system adapted to automatically handle computer resource changes, aggregate data from multiple data sources, automatically generate RBAC updates to reduce unnecessary messages or communications, etc. (e.g., to consolidate communications between parties within an enterprise). Moreover, communication links and messages may be automatically established, aggregated, formatted, modified, removed, exchanged, etc. to improve network performance (e.g., by reducing an amount of network messaging bandwidth and/or storage required to create access control messages or alerts, improve security, reduce the size of data stores, more efficiently collect, present, and utilize RBAC information, etc.).

Figure 2:
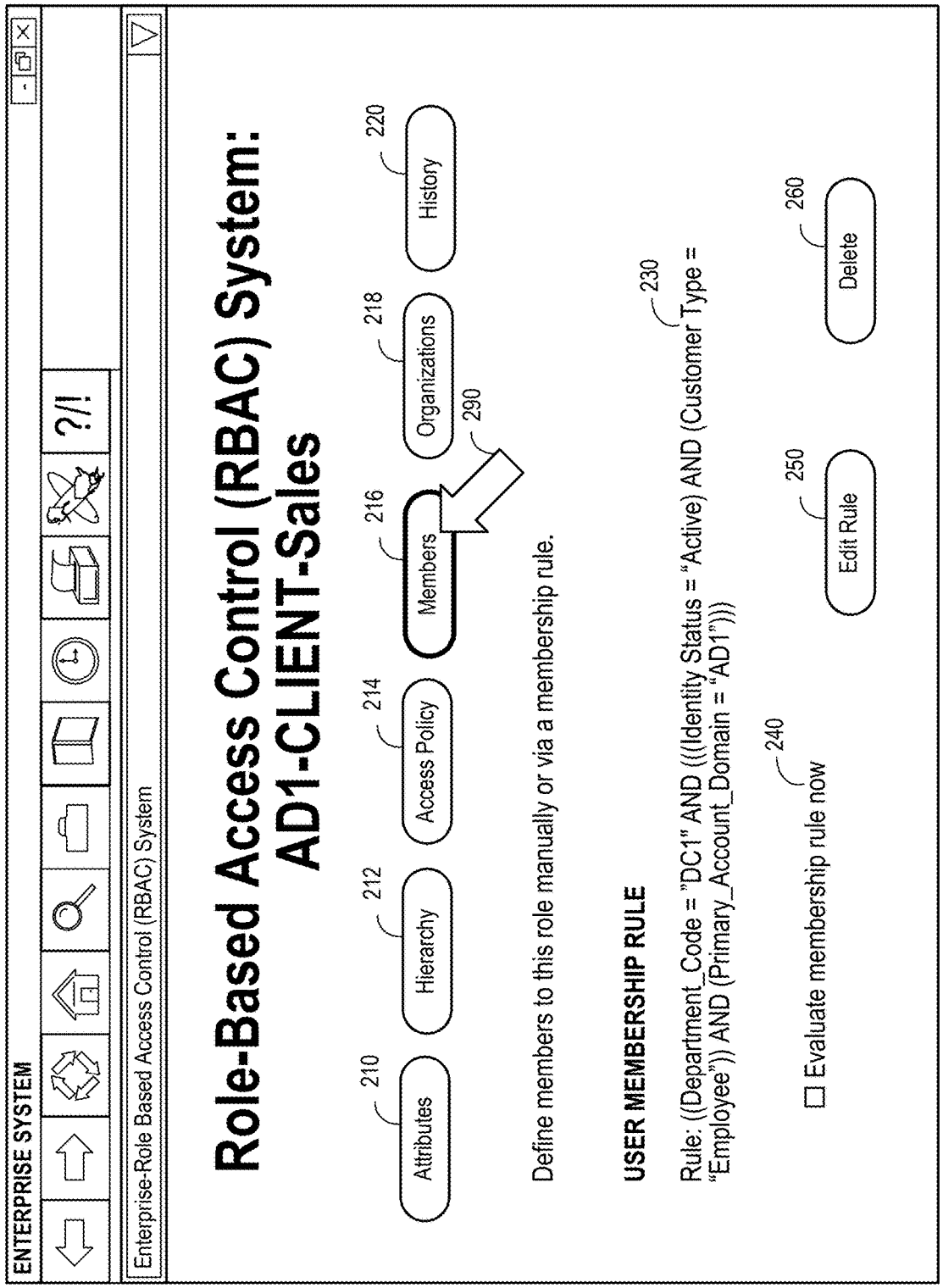
FIG. 2 is an example of a graphical user membership rules display.

An RBAC role is traditionally static in nature and the access provisioned by the role changes on demand. There is no automated adjustment to the scope of access provisioned by the role based on infrastructure and/or application changes. For example, an RBAC role may have a rule that defines who should be a member of the RBAC role. FIG. 2 is an example of a graphical user membership rules display 200. The display 200 includes navigation icons that may be used to select (e.g., via a touchscreen or computer mouse pointer 290) attributes 210, hierarchy 212, access policy 214, members 216, organizations 218, history 220, etc. The display 200 may be used to define members of a role manually or via a membership rule 230. In particular, the example of FIG. 2 defines an existing RBAC role "AD1-CLIENT-Sales" such that the role is granted to every active employee in department code "DC1." A user may select to evaluate the membership rule 240, edit the rule 250, delete the rule 260, etc.

Figure 3:
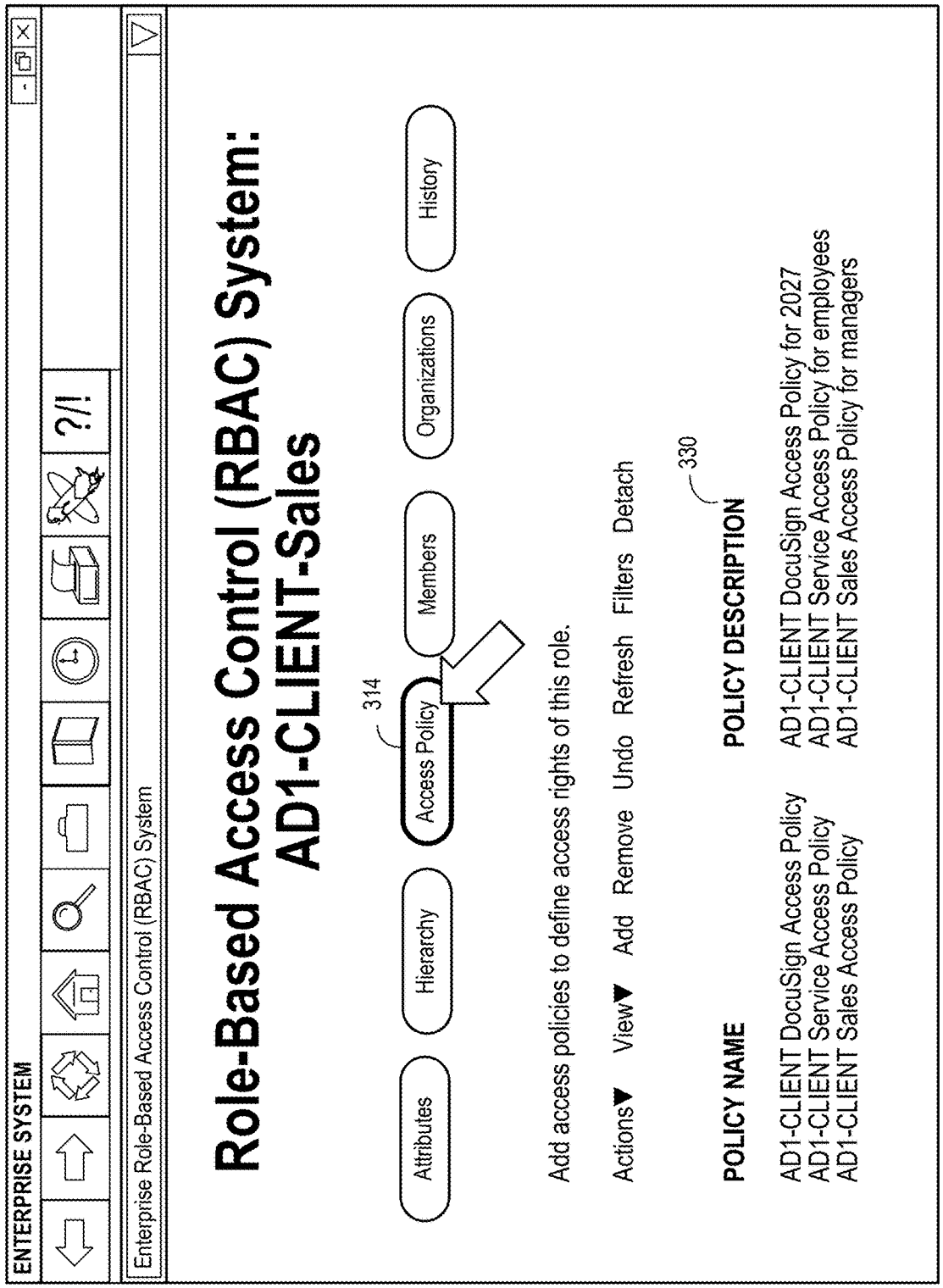
FIG. 3 is an example of an access policy display.

Access provisioned by the RBAC role is given to all members of the RBAC role (with membership identified through the rule 230) providing access to resources mapped to the role. For the AD1-CLIENT-Sales role, members may gain access to multiple Active Directory ("AD") groups, DocuSign accounts, etc. FIG. 3 is an example of an access policy display 300 where an access policy navigation icon 314 has been selected. The display 300 may be used to add or adjust access rights for the role (adding policies, removing policies, etc.) and includes a list 330 of existing policy names and associated descriptions.

Over time, the appropriate scope of an RBAC role might change. For example, a new DocuSign account may be created for the enterprise. In this case, the RBAC role "AD1-CLIENT-Sales" may require an update to accommodate the new DocuSign account. Conventional processes may require the following steps:
(1) The role owner submits a consult ticket to an identity and access management team;
(2) The identity and access management team reviews the requirements and sends it to a development team for implementation; and
(3) The development team updates the role scope, tests the changes, and moves the changes to a production system.

This overall process may take up to three or four weeks to implement. Moreover, current members of the RBAC role won't gain automated access to the new DocuSign account until the scope change is implemented.

Figure 4:
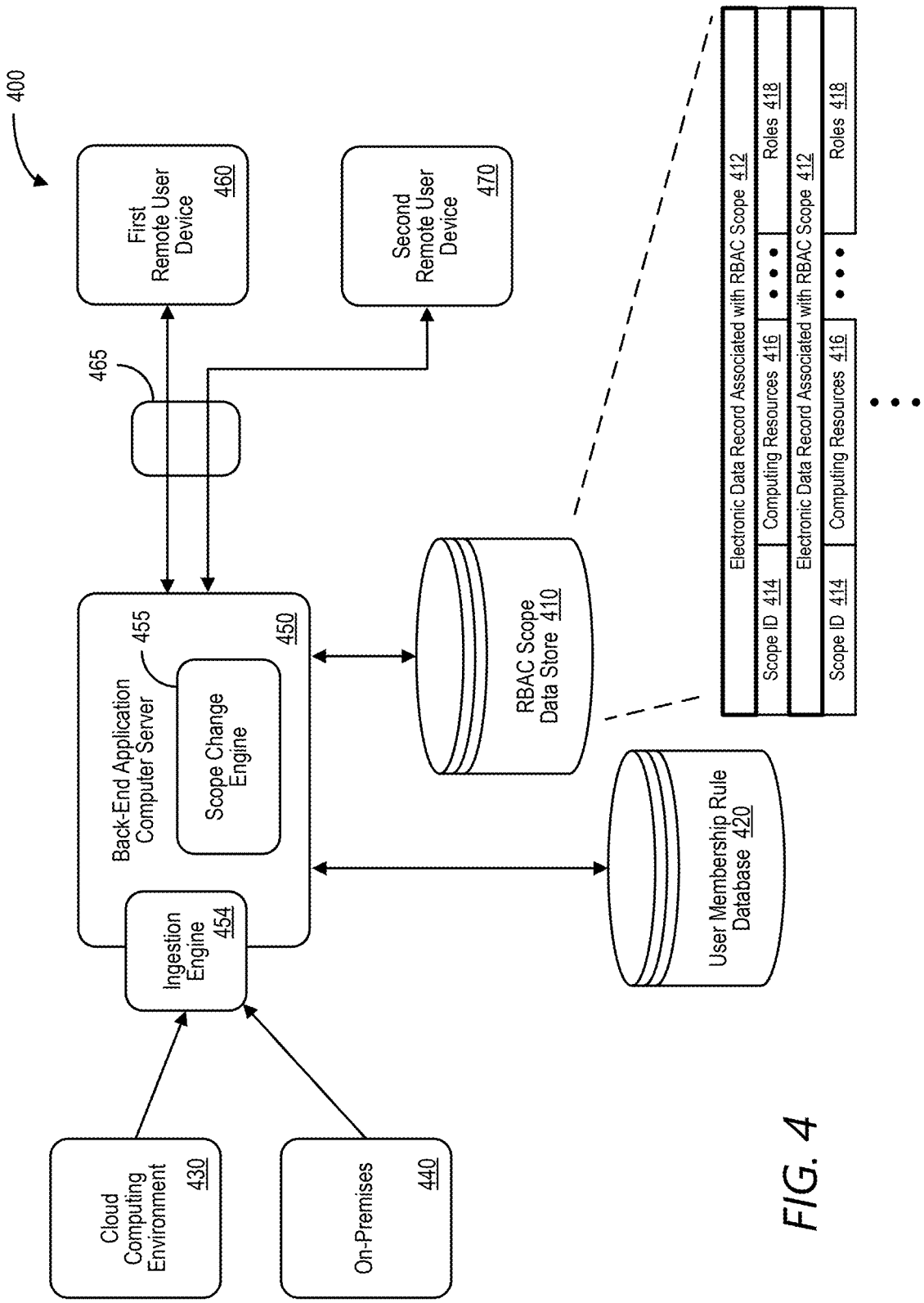
FIG. 4 is a high-level block diagram of an enterprise system in accordance with some embodiments.

Some embodiments described herein provide for automated RBAC scope changes to improve this process. FIG. 4 is a high-level block diagram of an enterprise access control system 400 that may be provided according to some embodiments of the present invention. In particular, the system 400 includes a back-end application computer server 450 that may access information in a RBAC scope data store 410 (e.g., storing a set of electronic records associated with RBAC scopes 412, each record including, for example, one or more scope identifiers 414, computing resources 416, information about roles 418, etc.). The back-end application computer server 450 may also store information into other data stores, such as a user membership rule database 420, and utilize an ingestion engine 454 and a scope change engine 455 to exchange and process messages and view, analyze, and/or update the electronic records. The back-end application computer server 450 may also exchange information with a first remote user device 460 and a second remote user device 470 (e.g., via a firewall 465). According to some embodiments, an interactive graphical user interface platform of the back-end application computer server 450 may facilitate the creation and review of access control information, recommendations, alerts, and/or the display of results via one or more remote administrator computers (e.g., to summarize system 400 performance) and/or the remote user devices 460, 470. For example, the first remote user device 460 may transmit annotated and/or updated information to the back-end application computer server 450. Based on the updated information, the back-end application computer server 450 may adjust data in the RBAC scope data store 410 and/or the user membership rules database 420 and the change may (or may not) be used in connection with the second remote user device 470. Note that the back-end application computer server 450 and/or any of the other devices and methods described herein might be associated with a third party, such as a vendor that performs a service for an enterprise. In some cases, the ingestion engine 454 may receive information about a cloud computing environment 430 and/or on-premise systems 440.

The back-end application computer server 450 and/or the other elements of the system 400 might be, for example, associated with a Personal Computer ("PC"), laptop computer, smartphone, an enterprise server, a server farm, and/or a database or similar storage devices. According to some embodiments, an "automated" back-end application computer server 450 (and/or other elements of the system 400) may facilitate the automated access and/or update of electronic records in the data stores 410, 420 and/or the management of user accounts and access. As used herein, the term "automated" may refer to, for example, actions that can be performed with little (or no) intervention by a human.

Devices, including those associated with the back-end application computer server 450 and any other apparatus described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 450 may store information into and/or retrieve information from the RBAC scope data store 410 and/or the user membership rules database 420. The data stores 410, 420 may be locally stored or reside remote from the back-end application computer server 450. As will be described further below, the RBAC scope data store 410 may be used by the back-end application computer server 450 in connection with an interactive user interface to facilitate access control for an enterprise. Although a single back-end application computer server 450 is shown in FIG. 4, any number of such devices may be included. Moreover, various devices described herein might be combined according to embodiments of the present invention. For example, in some embodiments, the back-end application computer server 450 and RBAC scope data store 410 might be co-located and/or may comprise a single apparatus.

Figure 5:
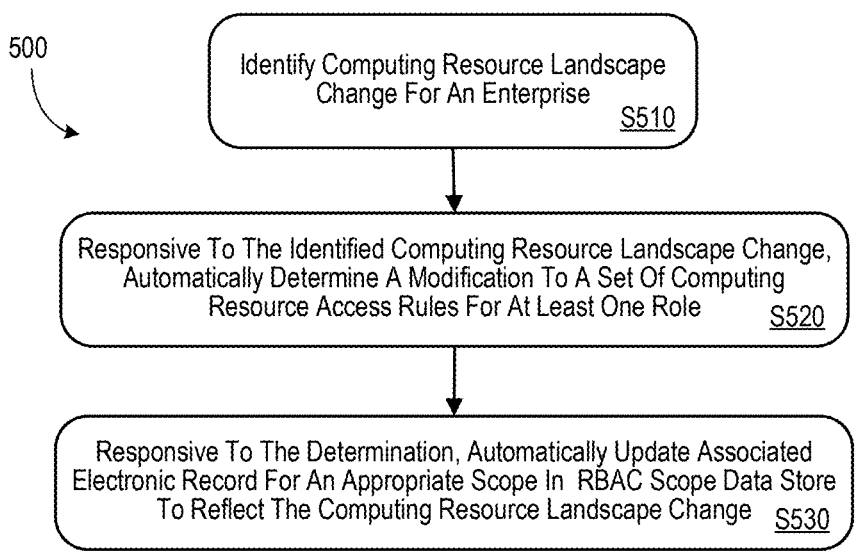
FIG. 5 illustrates a method according to some embodiments.

The elements of the system 400 may work together to perform the various embodiments of the present invention. Note that the system 400 of FIG. 4 is provided only as an example, and embodiments may be associated with additional elements or components. According to some embodiments, the elements of the system 400 automatically transmit information associated with an interactive user interface display over a distributed communication network. FIG. 5 illustrates a method 500 that might be performed by some or all of the elements of the system 400 described with respect to FIG. 4, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S510, a computer processor of a back-end application computer server may identify a computing resource landscape change for an enterprise. According to some embodiments, the identification of the landscape change is based on provisioning computing resources in a cloud-based computing environment. Embodiments may also involve the identification of landscape changes associated with on-premises computing resources. In some embodiments, the automatic identification of the landscape change is associated with an Information Technology ("IT") ticketing application and the back-end application computer server is associated with an identity and access management tool. For example, information for a ticket associated with provisioning a database service (e.g., a relational database service or any other type of database service) in a cloud computing environment may automatically extracted from an internal Application Programming Interface ("API") call to onboard the database service. The ticket might include, for example, a technology identifier, an endpoint, a database region, a cloud account number, an environment type, (e.g., "test" or "production"), etc. Responsive to the identified computing resource landscape change, at S520 the system may automatically determine a modification to a set of computing resource access rules for at least one role.

Responsive to the determination, the system may automatically update an associated electronic record for an appropriate scope in an RBAC scope data store to reflect the computing resource landscape change at S530. The RBAC scope data store may, according to some embodiments, contain electronic records associated with a plurality of scopes for the enterprise and (for each scope) a set of computing resources that are accessible by roles associated with that scope. The automatic update of the associated electronic record for the appropriate scope in the RBAC data store might represent, for example, an addition of a new database service, a deletion of an existing database service, etc. In some embodiments, a communication port coupled to the back-end application computer server facilitates an exchange of data with a remote device (via a distributed communication network) to support interactive user interface displays. The displays may include, for example, information about the updated scope in the RBAC data store to reflect the computing resource landscape change.

Figure 6:
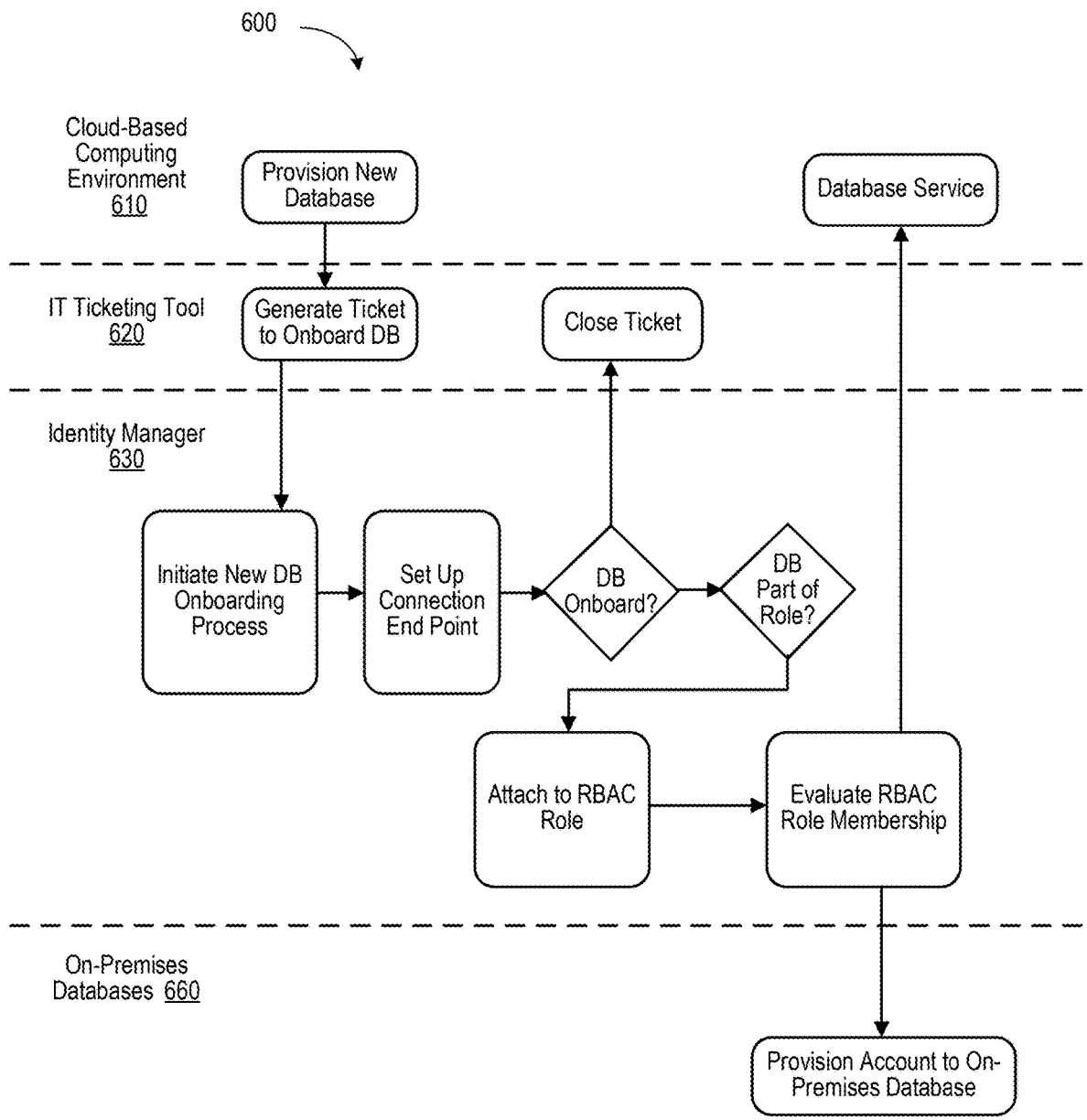
FIG. 6 is a workflow according to some embodiments.

FIG. 6 is a workflow 600 for enterprise database RBAC role automation according to some embodiments. Initially, a database may be provisioned in a cloud-based computing environment 610 such as an existing or new AMAZON™ Web Services (AWS®) account. This automatically results in the generation of a task in an IT ticketing tool 620. The task results in the initiation of a new database onboarding process in an enterprise identity manager 630. The identify manager 630 may comprise, for example, an identity and access management tool that performs RBAC for the enterprise. Multiple RBAC roles may be set with an automated rule using a workforce data attribute such as a department name, an expense code, etc. The presence of a rule allows for the automated provisioning of the RBAC role to employees whose data attributes align with those established by the rule. The onboarding process continues with setting up a connection endpoint. If the database is onboard, the task may be closed in the IT ticketing tool 620. Otherwise, it is determined if the database is part of a role and, if so, it is attached to the RBAC rule. RBAC role membership may then be evaluated and access may be provided to the new database service in the cloud-based computing environment 610. Similarly, access may be provided to an account of an on-premises database 660.

Thus, embodiments may provide for a one time creation of an RBAC role for a Database Service ("DS"), and the RBAC role may be set with an automated rule. This means that any user who is already a member of the role is automatically granted access to the newly onboarded database. For example, an RBAC role entitled "DS EDM DBA ROLE" may been set up to grant database access to all employees within an Enterprise Data Management ("EDM") department code. When a new DS entitled "DS1" is provisioned in the cloud, the identity manager 630 receives database onboarding information. And DS EDM DBA ROLE is updated to include new database "DS1" (that is, the role automatically expands to accommodate the new database). Moreover, all current members of DS EDM DBA ROLE are evaluated and provisioned access to the new database. A similar process may be arranged when database "DS1" is de-provisioned on the cloud (in which case, the identity manager receives de-provisioning information and DS EDM DBA ROLE contracts to remove database "DS1" from the role). In this way, embodiments may provision access to (or remove access from) members of the role without manual intervention.

Note that such an RBAC role with automated expansion and contraction may be applicable to all verticals in an enterprise. However, the approach may yield additional benefits for groups which work across all verticals, such as an EDM team.

A ticket may be automatically created for areas within the enterprise to consume changes pertaining to the new database. This ticket may, for example, have a task for an identity and access management team to onboard the new database in a repository. Ticket processing is currently automated. FIG. 7 is a graphical IT ticket display 700 in accordance with some embodiments. The ticket may have information 710 pertaining to the technology, endpoint, database region, cloud account number, environment type, a short description 720, and a more detailed description 730. According to some embodiments, some of the information 710 on the display 700 may be automatically extracted from an internal API call between the IT ticketing and identity and access management tool. For example, FIG. 8 is an internal API call 800 to onboard a non-production ("NONPROD") database according to some embodiments. The ticket number 810 may be used to automatically fill in the information 710 in the IT ticket display 700.

Figure 9:
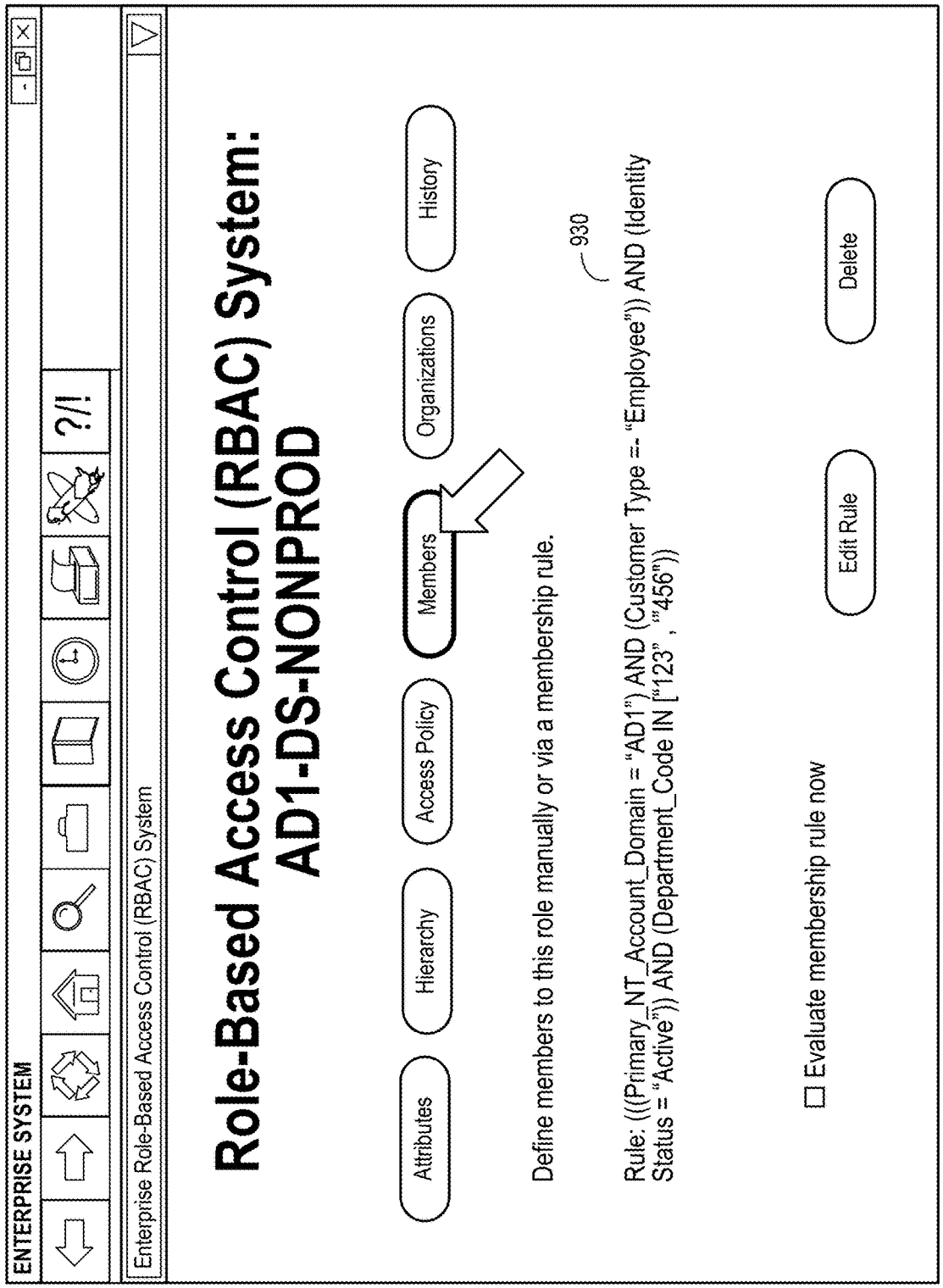
FIG. 9 is a user membership rules display in accordance with some embodiments.

Based on the information 710, a custom process in the identity manager tool may determine if the new database can be attached to an existing RBAC role. For example, FIG. 9 is a user membership rules display 900 in accordance with some embodiments. In the case of a NONPROD database (as per the preconfigured rule 930), members of an existing RBAC role "AD1-RDS-NONPROD" should have access to the newly provisioned database. The custom RBAC scope change process modifies the scope of the RBAC role "AD1-RDS-NONPROD" and adds the new database to its scope. In this way, all current members of the role gain access to the new database. Note that this process does not require any manual intervention, is driven by a change to the infrastructure landscape, is technology and platform agnostic, and new provisions may obtain access within a few hours of the newly provisioned database (or any other infrastructure components).

Figure 10:
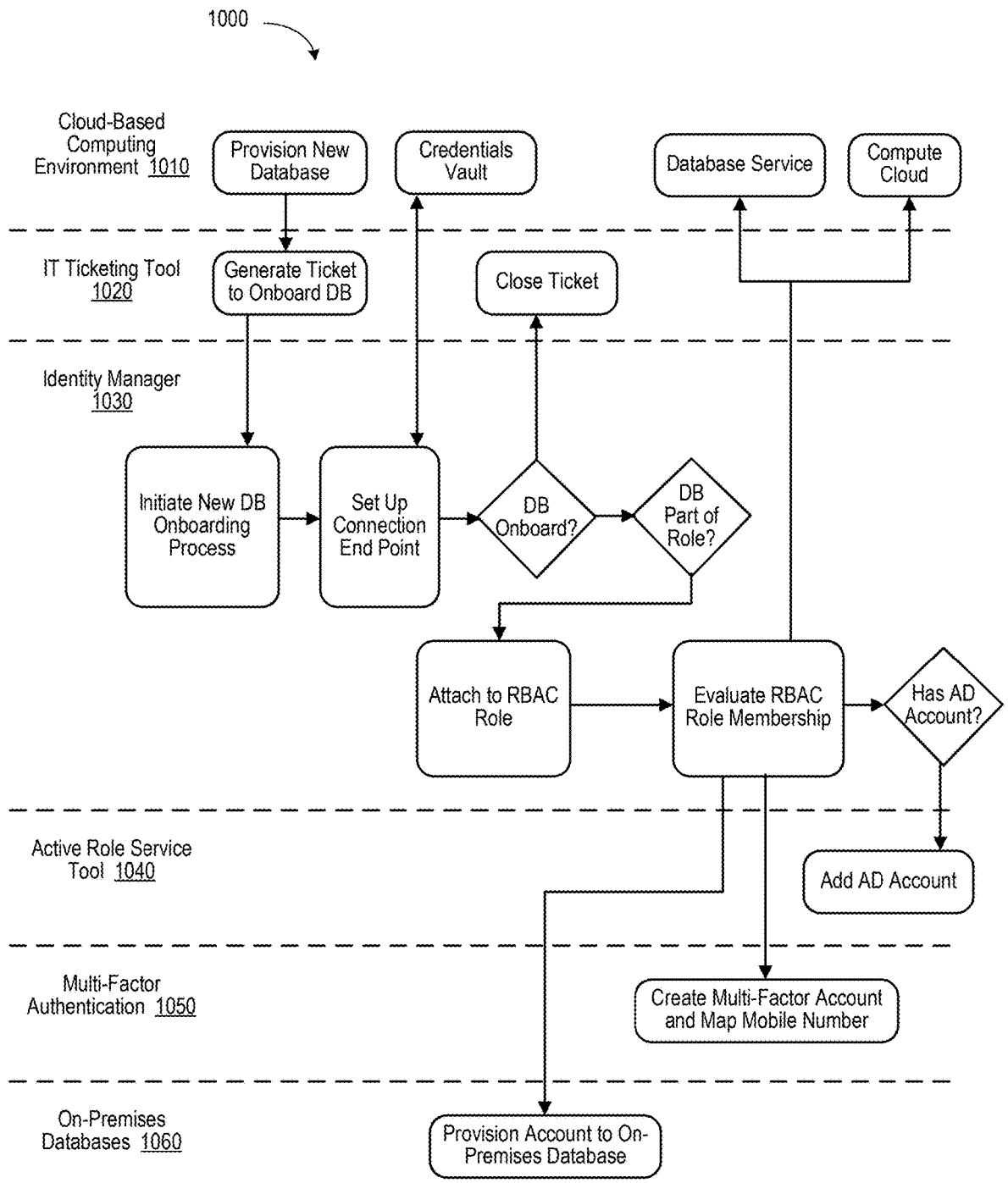
FIG. 10 is a more detailed workflow according to some embodiments.

FIG. 10 is a more detailed workflow 1000 according to some embodiments. As before, a database may be provisioned in a cloud-based computing environment 1010 such as an existing or new AMAZON™ AWS® account. This automatically results in the generation of a task in an IT ticketing tool 1020. The task results in the initiation of a new database onboarding process in an enterprise identity manager 1030. The onboarding process continues with setting up a connection endpoint via coordination with a credentials vault in the cloud-based computing environment 1010. If the database is onboard, the task may be closed in the IT ticketing tool 1020. Otherwise, it is determined if the database is part of a role and, if so, it is attached to the RBAC rule. RBAC role membership may then be evaluated. The evaluation may further be based on a multi-factor authentication 1050. Moreover, if the RBAC role is not associated with an AD account one may be created by an active role service tool 1040. Access may be provided to the new database service (e.g., an AMAZON™ AURORA® database service) and/or a compute cloud (e.g., an AWS® Elastic Compute Cloud ("E2C")) in the cloud-based computing environment 1010. Similarly, access may be provided to an account of an on-premises database 1060.

Figure 11:
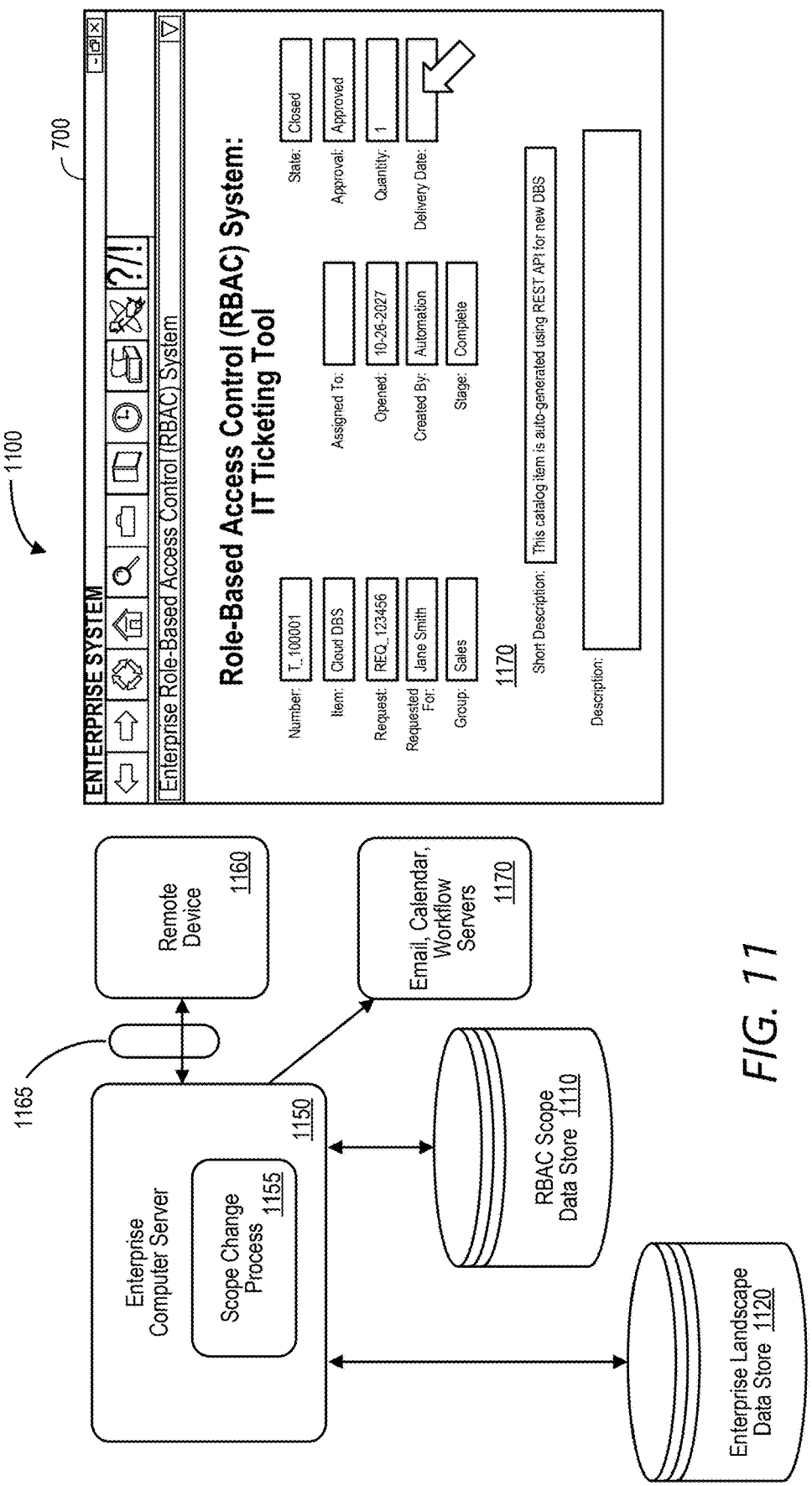
FIG. 11 is a more detailed system according to some embodiments.

FIG. 11 is a more detailed system 1100 according to some embodiments. As before, the system 1100 includes an enterprise computer server 1150 that may access information in an RBAC scope data store 1110 (e.g., storing a set of electronic records associated with scopes including a scope identifier, computing resources, information about roles, etc.) and an enterprise landscape data store 1120. The enterprise computer server 1150 may also utilize a scope change process 1155 to exchange and process access control information and view, analyze, and/or update the electronic records. The enterprise computer server 1150 may also exchange information with a remote device 1160 (e.g., via a firewall 1165). According to some embodiments, the back-end application computer server 1150 may automatically generate an IT ticket 700 and interact with an email server (e.g., to automatically establish communication links and/or transmit electronic messages), a calendar server (e.g., to automatically schedule tasks or ticket requests), and/or a workflow server 1170 (e.g., to initiate actions by employees or programs of the enterprise).

Figure 12:
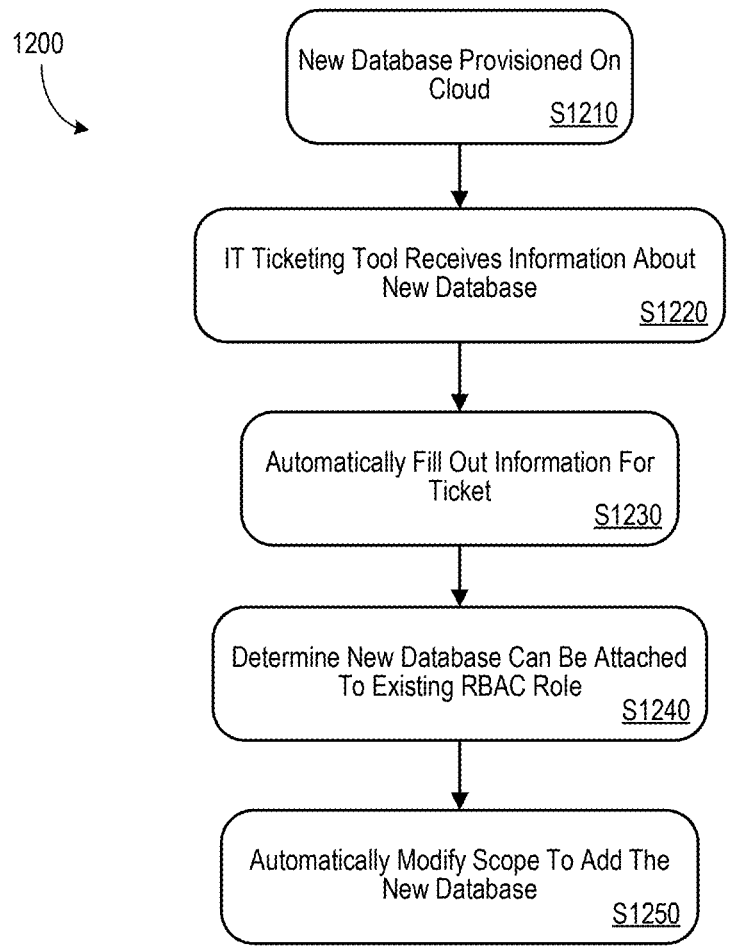
FIG. 12 is a more detailed method according to some embodiments.

FIG. 12 is a more detailed method 1200 according to some embodiments. At S1210, a new database is provisioned on the cloud. An IT ticketing tool receives information about the new database at S1220, and automatically fills out information for a ticket or task at S1230. At S1240, it is determined if the new database can be attached to one or more existing RBAC roles. If so, at S1250 the system automatically modifies an RBAC scope to add the new database.

Figure 13:
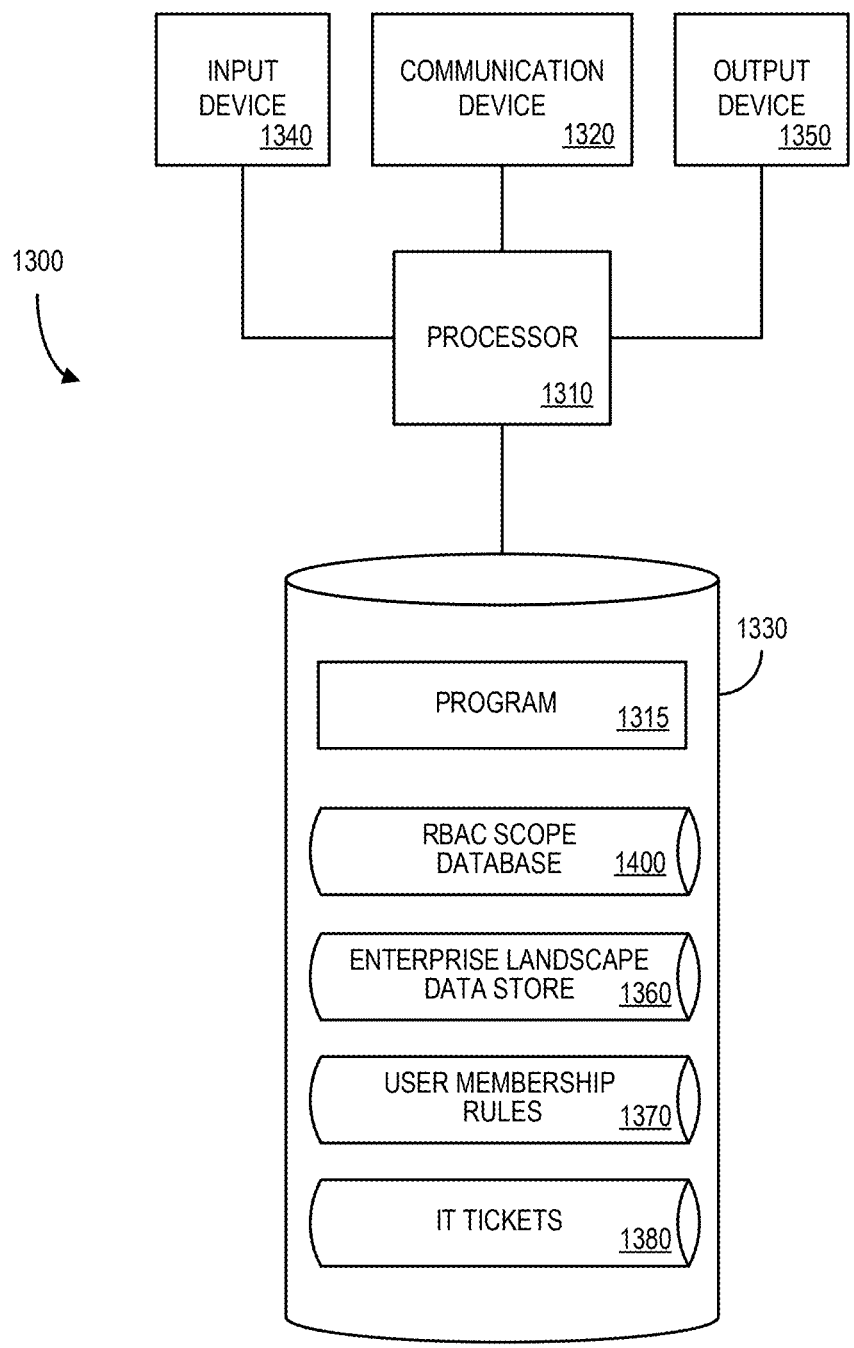
FIG. 13 is a block diagram of an apparatus in accordance with some embodiments.

The embodiments described herein may be implemented using any number of different hardware configurations. For example, FIG. 13 illustrates an apparatus 1300 that may be, for example, associated with the systems 400, 1100 described with respect to FIGS. 4 and 11, respectively (or any other system described herein). The apparatus 1300 comprises a processor 1310, such as one or more commercially available Central Processing Units ("CPUs") in the form of one-chip microprocessors, coupled to a communication device 1320 configured to communicate via a communication network (not shown in FIG. 13). The communication device 1320 may be used to communicate, for example, with one or more remote cloud or on-premise systems, administrators, enterprise employees, and/or communication devices (e.g., PCs and smartphones). Note that communications exchanged via the communication device 1320 may utilize security features, such as those between a public internet user and an internal network of an insurance company and/or an enterprise. The security features might be associated with, for example, web servers, firewalls, and/or PCI infrastructure. The apparatus 1300 further includes an input device 1340 (e.g., a mouse and/or keyboard to enter information about RBAC scopes and roles, etc.) and an output device 1350 (e.g., to output reports regarding enterprise access control, recommendations, alerts, etc.).

The processor 1310 also communicates with a storage device 1330. The storage device 1330 may comprise any appropriate information storage device, including combinations of magnetic storage devices (e.g., a hard disk drive), optical storage devices, mobile telephones, and/or semiconductor memory devices. The storage device 1330 stores a program 1315 and/or an access control tool or application for controlling the processor 1310. The processor 1310 performs instructions of the program 1315, and thereby operates in accordance with any of the embodiments described herein. For example, the processor 1310 may identify a computing resource landscape change for the enterprise. Responsive to the identified computing resource landscape change, the processor 1310 may automatically determine a modification to a set of computing resource access rules for at least one role. The processor 1310 may then, responsive to the determination, automatically update the associated electronic record for the appropriate scope in the RBAC data store to reflect the computing resource landscape change.

The program 1315 may be stored in a compressed, uncompiled and/or encrypted format. The program 1315 may furthermore include other program elements, such as an operating system, a database management system, and/or device drivers used by the processor 1310 to interface with peripheral devices.

As used herein, information may be "received" by or "transmitted" to, for example: (i) the apparatus 1300 from another device; or (ii) a software application or module within the apparatus 1300 from another software application, module, or any other source.

In some embodiments (such as shown in FIG. 13), the storage device 1330 further includes an RBAC scope database 1400, an enterprise landscape data store 1360, user membership rules 1370, and IT tickets 1380. An example of a database that might be used in connection with the apparatus 1300 will now be described in detail with respect to FIG. 14. Note that the database described herein is only an example, and additional and/or different information may be stored therein. Moreover, various databases might be split or combined in accordance with any of the embodiments described herein. For example, the enterprise landscape data store 1360 and IT tickets 1380 might be combined and/or linked to each other within the program 1315.

Figure 14:
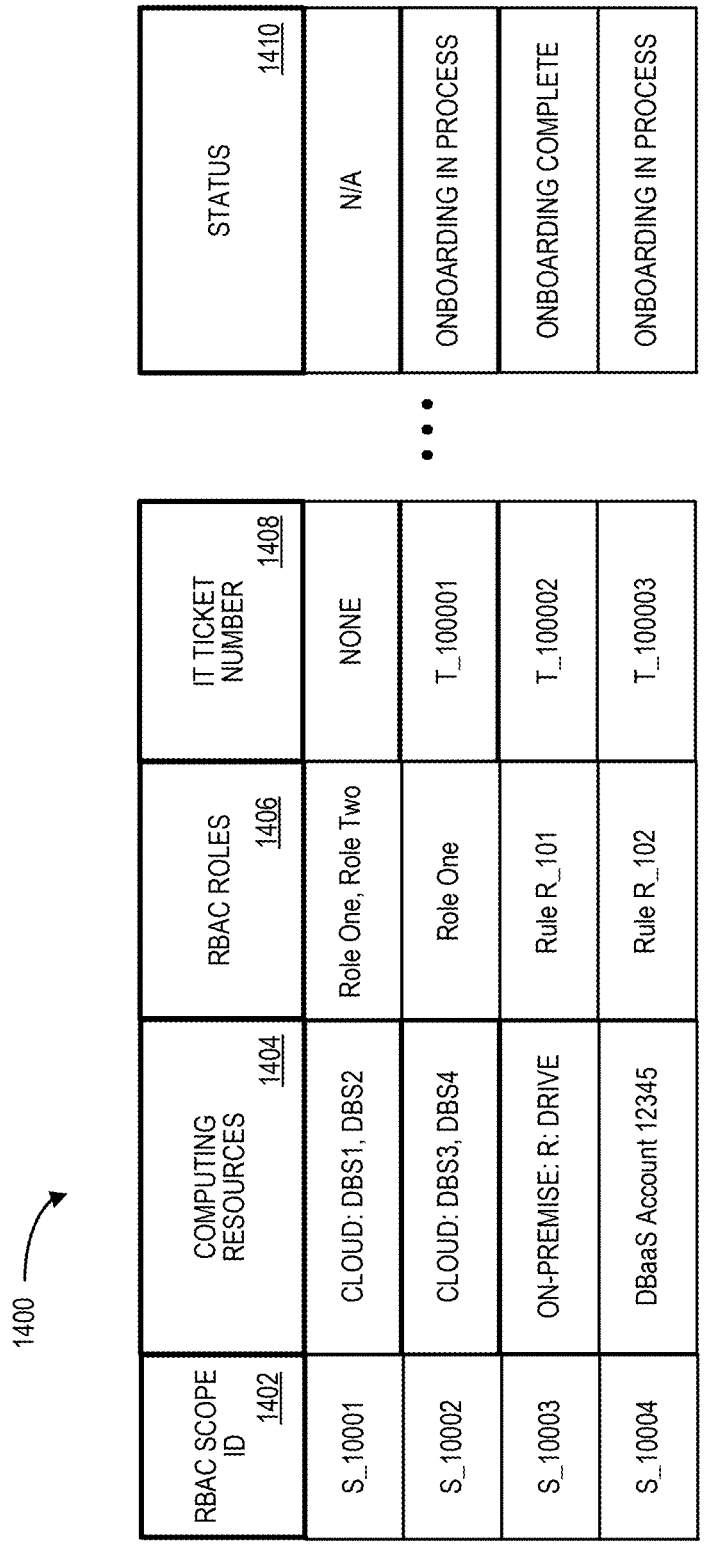
FIG. 14 is a portion of a tabular RBAC scope database according to some embodiments.

Referring to FIG. 14, a table is shown that represents the RBAC scope database 1400 that may be stored at the apparatus 1300 according to some embodiments. The table may include, for example, entries associated with different scopes that are associated with an access control system of an enterprise. The table may also define fields 1402, 1404, 1406, 1408, 1410 for each of the entries. The fields 1402, 1404, 1406, 1408, 1410 may, according to some embodiments, specify: an RBAC scope identifier 1402, computing resources 1404, an RBAC roles 1406, an IT ticket number 1408, and a status 1410. The RBAC scope database 1400 may be created and updated, for example, when a new score is created, an existing user membership rule is changed, and/or a computing landscape is updated in connection with an enterprise.

The RBAC scope identifier 1402 may be, for example, a unique alphanumeric code associated with user access to computing resources for various roles in an enterprise. The computing resources 1404 may reflect, for example, various databases, services, file storage locations, etc. The RBAC roles 1406 may comprise a list of user identifiers or a membership rule that defines which users should be included in the role. The IT ticket number 1408 may be associated with tasks to add a database, delete a database, etc. (and may be based on or associated with information 710 automatically extracted from an API call 800 to populate the ticketing tool display 700). The status 1410 might indicate that a ticket or task for onboarding is in process, is completed, etc.

Figure 15:
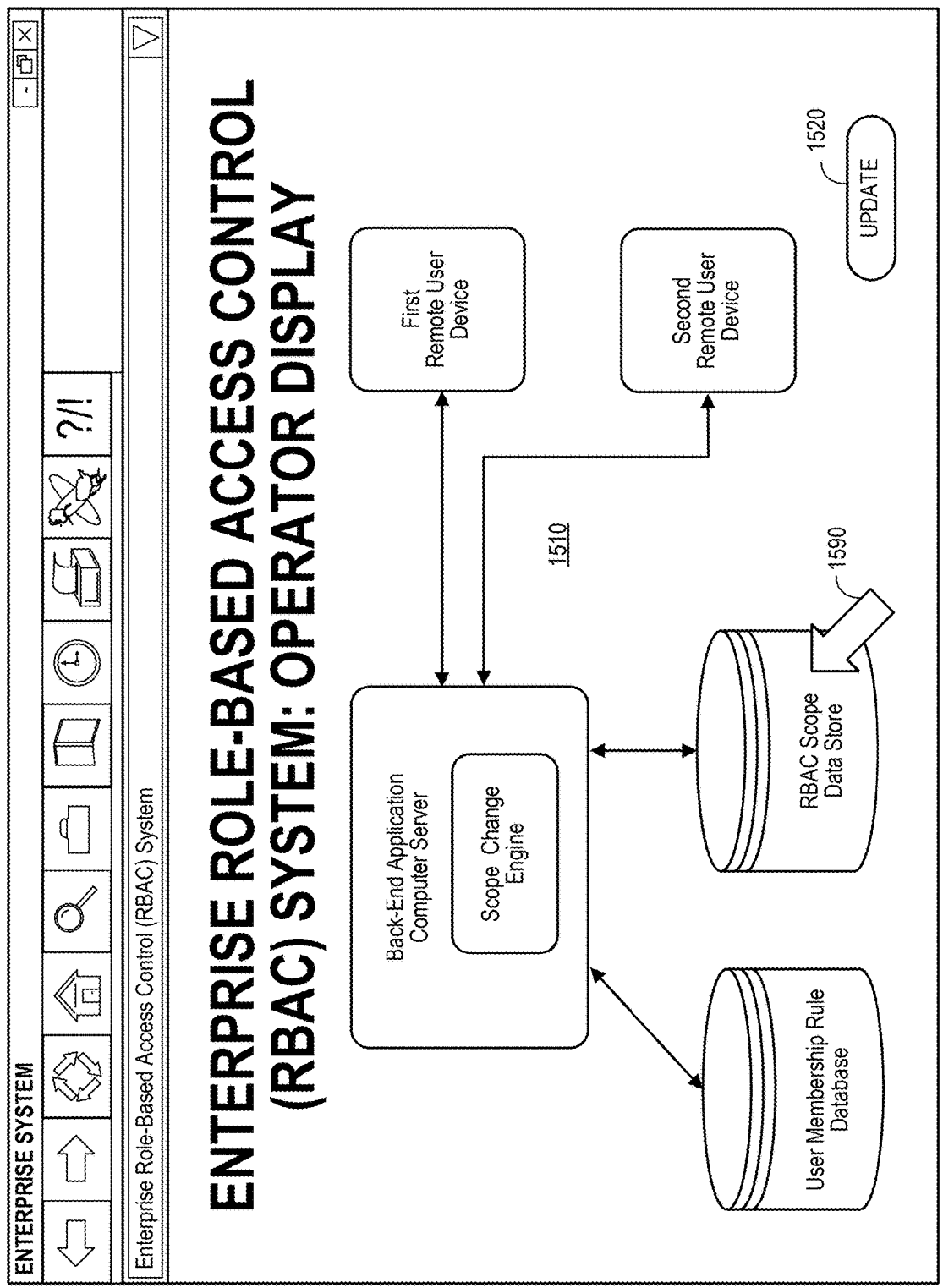
FIG. 15 is an operator or administrator display in accordance with some embodiments.

The operation of the enterprise access control system may be controlled via a Graphical User Interface ("GUI"). For example, FIG. 15 is an enterprise access control system operator or administrator display 1500 including graphical representations of elements of such a tool 1510 according to some embodiments. Selection of a portion or element of the display 1500 via a touchscreen or pointer 1590 might result in the presentation of additional information about that portion or element (e.g., a popup window presenting data mappings, RBAC scope or rule details, etc.) or let an operator or administrator enter or annotate additional information about access control (e.g., based on his or her experience and expertise). An "Update" icon 1520 might let the administrator save updates and changes to the tool 1510.

Thus, embodiments may facilitate automated RBAC scope changes letting roles expand and contract based on infrastructure provisioned or decommissioned in the cloud. This lets the role automatically mimic the landscape and grant real time access to eligible employees. Note that this process does not require any manual intervention, is driven by a change to the infrastructure landscape, is technology and platform agnostic, and new provisions may obtain access within a few hours of the newly provisioned database (or any other infrastructure components). Such an approach may reduce costs, allow for faster onboarding, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 16:
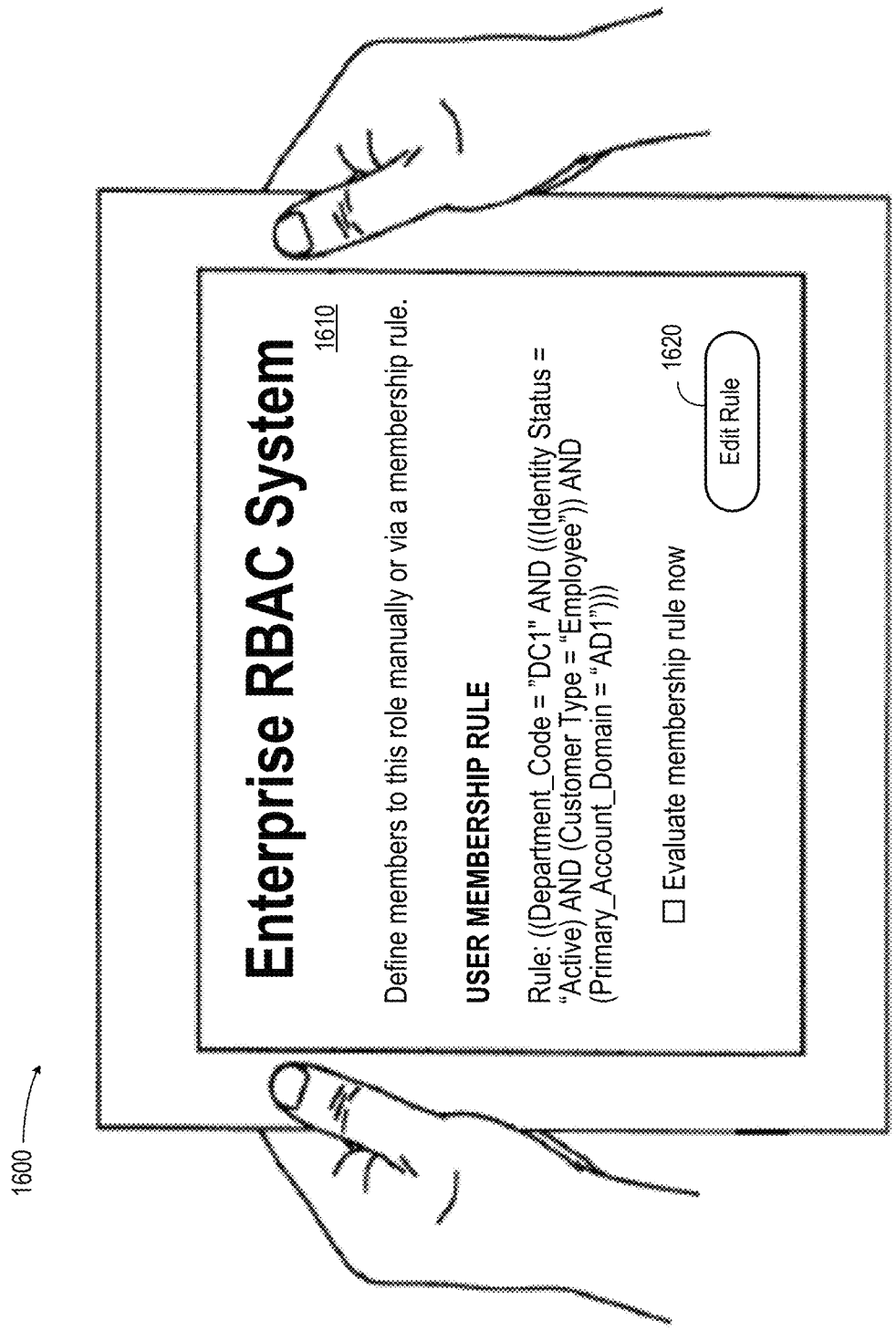
FIG. 16 is a tablet computer according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to specific types of enterprise rules, embodiments may instead be associated with other types of insurers, businesses, and organizations instead. FIG. 16 illustrates a handheld tablet 1600 in accordance with some embodiments. A user membership rule display 1610 might, for example, let an operator improve cloud access rules for an enterprise via an "Edit Rule" icon 1620. Note that embodiments might be associated with any type of business (e.g., insurance companies, financial enterprises, educational institutions, etc.).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed:

1. An access control system implemented via a back-end application computer server of an enterprise associated with an identity and access management tool, comprising:
   (a) a Role-Based Access Control ("RBAC") scope data store that contains electronic records associated with a plurality of scopes for the enterprise and, for each scope, a set of computing resources that are accessible by roles associated with that scope;
   (b) the back-end application computer server, coupled to the RBAC scope data store, including:
   a computer processor, and
   a computer memory coupled to the computer processor and storing instructions that, when executed by the computer processor, cause the back-end application computer server to:
   identify a computing resource landscape change for the enterprise associated with an Information Technology ("IT") ticketing application,
   responsive to the identified computing resource landscape change, automatically determine a modification to a set of computing resource access rules for at least one role, and
   responsive to the determination, automatically update the associated electronic record for the appropriate scope in the RBAC scope data store to reflect the computing resource landscape change representing at least one of: (i) an addition of a new database service, and (ii) a deletion of an existing database service,
   wherein information for a ticket associated with provisioning a database service in a cloud computing environment is automatically extracted from an internal Application Programming Interface ("API") call to onboard the database service; and
   (c) a communication port coupled to the back-end application computer server to facilitate an exchange of data with a remote device via a distributed communication network to support interactive user interface displays that include information about the updated scope in the RBAC data store to reflect the computing resource landscape change.

2. The system of claim 1, wherein the identification of the landscape change is based on provisioning computing resources in a cloud-based computing environment.

3. The system of claim 1, wherein the identification of the landscape change is associated with on-premises computing resources.

4. The system of claim 1, wherein the ticket includes at least one of: (i) a technology identifier, (ii) an endpoint, (iii) database region, (iv) a cloud account number, and (v) an environment type.

5. An access control method implemented via a back-end application computer server of an enterprise associated with an identity and access management tool, comprising:
   identifying, by a computer processor of the back-end application computer server, a computing resource landscape change for the enterprise associated with an Information Technology ("IT") ticketing application;
   responsive to the identified computing resource landscape change, automatically determining a modification to a set of computing resource access rules for at least one role;
   responsive to the determination, automatically updating an associated electronic record for an appropriate scope in a Role-Based Access Control ("RBAC") scope data store to reflect the computing resource landscape change, wherein the RBAC scope data store contains electronic records associated with a plurality of scopes for the enterprise and, for each scope, a set of computing resources that are accessible by roles associated with that scope,
   wherein the automatic update of the associated electronic record for the appropriate scope in the RBAC scope data store represents at least one of: (i) an addition of a new database service, and (ii) a deletion of an existing database service; and information for a ticket associated with provisioning a database service in a cloud computing environment is automatically extracted from an internal Application Programming Interface ("API") call to onboard the database service; and
   exchanging data between the back-end application computer server and a remote device, via a distributed communication network, to support interactive user interface displays that include information about the updated scope in the RBAC data store to reflect the computing resource landscape change.

6. The method of claim 5, wherein the identification of the landscape change is based on provisioning computing resources in a cloud-based computing environment.

7. The method of claim 5, wherein the identification of the landscape change is associated with on-premises computing resources.

8. The method of claim 5, wherein the ticket includes at least one of: (i) a technology identifier, (ii) an endpoint, (iii) database region, (iv) a cloud account number, and (v) an environment type.

9. A non-transitory, computer-readable medium storing instructions, that, when executed by a processor, cause the processor to perform an access control method implemented via a back-end application computer server of an enterprise associated with an identity and access management tool, the method comprising:
 identifying, by a computer processor of the back-end application computer server, a computing resource landscape change for the enterprise associated with an Information Technology ("IT") ticketing application;
 responsive to the identified computing resource landscape change, automatically determining a modification to a set of computing resource access rules for at least one role;
 responsive to the determination, automatically updating an associated electronic record for an appropriate scope in a Role-Based Access Control ("RBAC") scope data store to reflect the computing resource landscape change, wherein the RBAC scope data store contains electronic records associated with a plurality of scopes for the enterprise and, for each scope, a set of computing resources that are accessible by roles associated with that scope,
 wherein the automatic update of the associated electronic record for the appropriate scope in the RBAC scope data store represents at least one of: (i) an addition of a new database service, and (ii) a deletion of an existing database service; and information for a ticket associated with provisioning a database service in a cloud computing environment is automatically extracted from an internal Application Programming Interface ("API") call to onboard the database service; and
 exchanging data between the back-end application computer server and a remote device, via a distributed communication network, to support interactive user interface displays that include information about the updated scope in the RBAC data store to reflect the computing resource landscape change.

10. The medium of claim 9, wherein the identification of the landscape change is based on provisioning computing resources in a cloud-based computing environment.

11. The medium of claim 9, wherein the identification of the landscape change is associated with on-premises computing resources.

* * * * *